United States Patent

Heightley

[15] 3,700,874

[45] Oct. 24, 1972

[54] THRESHOLD LOGIC OVERFLOW DETECTOR

[72] Inventor: John Donnell Heightley, Basking Ridge, N.J.

[73] Assignee: Bell Telephone Laboratories, Incorporated, Murray Hill, Berkeley Heights, N.J.

[22] Filed: March 4, 1971

[21] Appl. No.: 120,833

[52] U.S. Cl. ..................235/164, 235/168, 235/172

[51] Int. Cl. ..............................................G06f 7/48

[58] Field of Search......235/164, 168, 172, 175, 176, 235/156

[56] References Cited

UNITED STATES PATENTS 3,609,568 9/1971 Jackson................235/156 X

OTHER PUBLICATIONS

R. P. M. Ebert, " Overflow Oscillations in Digital Filters," Bell System Technical Journal, November, 1969, pp. 2999– 3020.

*Primary Examiner*—Eugene G. Botz
*Assistant Examiner*—David H. Malzahn
*Attorney*—R. J. Guenther and Kenneth B. Hamlin

[57] ABSTRACT

An overflow detector circuit for a digital filter comprises threshold logic arrangements that detect the occurrence and the polarity of any overflows generated in two adders and a multiplier. In addition, threshold logic circuitry detects all possible net overflow conditions of either polarity resulting from computations made in the adders and the multiplier. Every net overflow signal corrects for the net overflow condition.

12 Claims, 7 Drawing Figures

INVENTOR
J. D. HEIGHTLEY
BY *Richard B. Havill*
ATTORNEY

FIG. 4

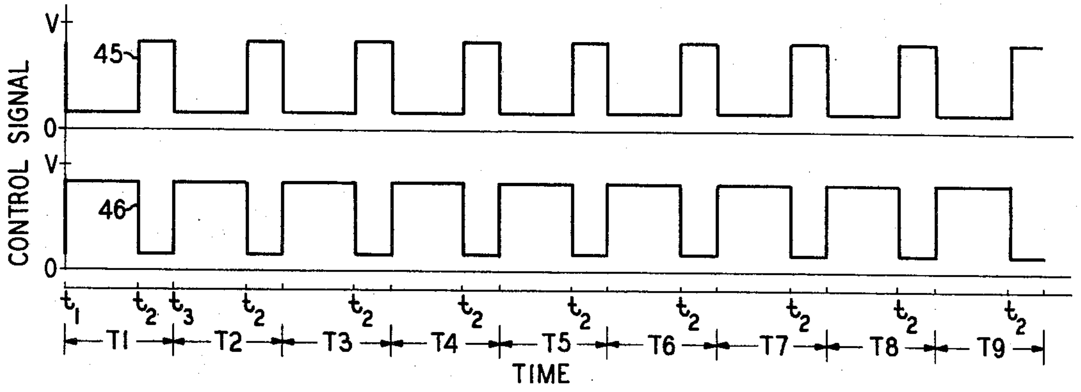

FIG. 5

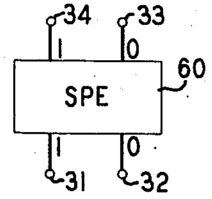

FIG. 6

| 1 | 2 | 3 | 4 | 5 | 6 | 7 | 8 | 9 | 10 |
|---|---|---|---|---|---|---|---|---|---|
| PARTIAL POSITIVE OVERFLOWS | PARTIAL NEGATIVE OVERFLOWS | UNITS OF CURRENT STEERED BY CIRCUITS 76,84&101 TO BUS 111 | UNITS OF CURRENT STEERED BY CIRCUIT 112 TO BUS 111 | TOTAL UNITS OF CURRENT IN BUS 111 | NET POSITIVE OVERFLOW | UNITS OF CURRENT STEERED BY CIRCUITS 78,85&102 TO BUS 117 | UNITS OF CURRENT STEERED BY CIRCUIT 118 TO BUS 117 | TOTAL UNITS OF CURRENT IN BUS 117 | NET NEGATIVE OVERFLOW |
| 0 | 0 | 3 | 0 | 3 | NO | 3 | 0 | 3 | NO |
| 1 | 0 | 2 | 0 | 2 | YES | 3 | 1 | 4 | NO |
| 2 | 0 | 1 | 0 | 1 | YES | 3 | 1 | 4 | NO |
| 3 | 0 | 0 | 0 | 0 | YES | 3 | 1 | 4 | NO |
| 0 | 1 | 3 | 1 | 4 | NO | 2 | 0 | 2 | YES |
| 0 | 2 | 3 | 1 | 4 | NO | 1 | 0 | 1 | YES |
| 0 | 3 | 3 | 1 | 4 | NO | 0 | 0 | 0 | YES |
| 2 | 1 | 1 | 1 | 2 | YES | 2 | 1 | 3 | NO |
| 1 | 2 | 2 | 1 | 3 | NO | 1 | 1 | 2 | YES |
| 1 | 1 | 2 | 1 | 3 | NO | 2 | 1 | 3 | NO |

THRESHOLD LOGIC OVERFLOW DETECTOR

BACKGROUND OF THE INVENTION

1. Field of the Invention

The invention is an overflow detector circuit that is more particularly described as a threshold logic overflow detector for a data processor.

2. Description of the Prior Art

One type of a special purpose digital data processor is a digital filter. Many digital filter configurations are known in the prior art. Such filters are described at length by B. Gold and C. M. Rader in their text entitled "Digital Processing of Signals," McGraw-Hill, Inc., 1969 and by L. B. Jackson, J. F. Kaiser, and H. S. McDonald in an article entitled "An Approach to the Implementation of Digital Filters," IEEE Transactions on Audio and Electro-acoustics, Vol. AU-16, No. 3, Sept. 1968, pp. 413–421.

The digital filters described in the aforementioned disclosures perform a series of arithmetic operations on groups of binary signals, each group of signals being a binary code representation of the amplitude of a discrete sample of an analog signal taken at a definite time. A series of samples of the analog signal are taken at uniformly spaced intervals. Each group of binary signals, or code word, has a limited number of bits therein because circuits for processing the signals are limited to a number of places $n$ usually sufficient for satisfactory filter operation.

Multiplication and addition are two binary arithmetic operations performed in digital filters. Addition and multiplication are facilitated by using a sign-magnitude representation for multiplication and by using a two's-complement representation for addition.

Serial multipliers use the sign-magnitude representation wherein there are $n$ bits in each word. These $n$ bits are aligned sequentially with the least significant bit first. The first n-1 bits comprise a magnitude component in which the bits are arranged in conventional binary order. The last bit is a sign bit which may be either a "0" or a "1," respectively indicating that the number is positive or negative.

Serial adders use the two's-complement representation of binary numbers for convenient processing. An extensive discussion of two's-complement arithmetic is found in Chapter 3 of "The Logic of Computer Arithmetic" by Ivan Flores, Prentice-Hall, Inc., 1963. Basically, there are $n$ bits aligned sequentially in each word in the two's-complement representation. The last bit of each word is a sign bit which is a "0" or a "1," respectively indicating that the number is positive or negative.

The first $n$-1 bits of each two's-complement word represent the magnitude of the number in a different binary code. Positive numbers have a two's-complement magnitude representation which is identical to the binary number equal to the magnitude. Negative numbers, on the other hand, have a representation which is expressed by complementing all bits of the sign-magnitude representation and increasing the resulting complemented number by one.

Because of carries that occur during the multiplication and addition operations, a product or a sum may from time to time include $n$ bits in the magnitude component of the number. Thus one bit of the magnitude component spills over into the place reserved for the sign bit. Such a spillover into the place for the sign bit in a particular code word is called an overflow.

Overflows can cause the digital filter to produce an erroneous output, however, any overflow in a code word may be canceled by another overflow of opposite polarity when the two overflowed numbers are added together. If the overflow subsequently is canceled, the resulting word in the digital filter is considered to be accurate. However, if the overflow is not canceled, the resulting word is considered to include an erroneous net overflow which causes undesirable oscillations in the output of the digital filter.

Therefore, it is an object of the invention to develop a logic circuit that will detect all net overflow conditions occurring in a digital filter.

SUMMARY OF THE INVENTION

This and other objects of the invention are achieved by an improved overflow detector circuit. The circuit detects an overflow of either polarity produced by a first adder, detects an overflow of either polarity produced by a second adder, and detects an overflow of either polarity produced by a multiplier. Threshold logic circuits responsive to six possible overflow conditions detect all possible net overflow conditions resulting from all possible combinations of the six overflow conditions.

A feature of the invention is a threshold logic arrangement for detecting an overflow from an adder.

Another feature is a threshold logic arrangement for detecting an overflow from a multiplier.

A further feature is a threshold logic arrangement responsive to overflows of both polarities from two adders and a multiplier for detecting and signaling all possible net overflow conditions.

BRIEF DESCRIPTION OF THE DRAWINGS

A better understanding of the invention may be derived from the detailed description following if that description is considered with respect to the attached drawings in which:

FIG. 4 is a timing diagram for signals used to drive storage-processor elements in the overflow detector circuit;

FIG. 5 is a symbolic block representing the storage-processor element;

FIG. 6 is a logic table showing net overflow detection; and

DETAILED DESCRIPTION

Figure 1:
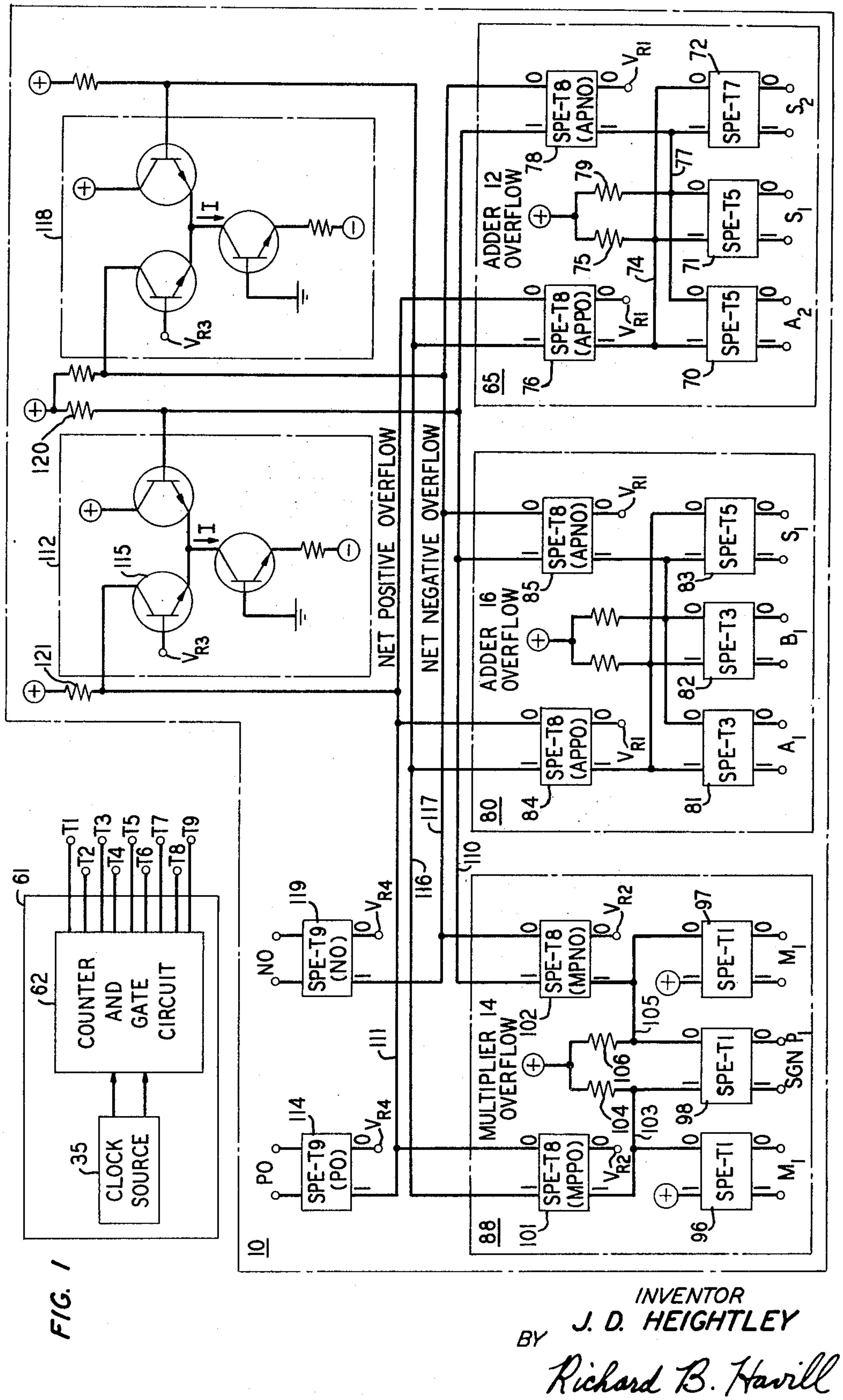
FIG. 1 is a block diagram of an overflow detector circuit in accordance with the invention.

Referring now to FIG. 1, there is shown a block diagram of a threshold logic overflow detector circuit for a digital filter.

Figure 2:
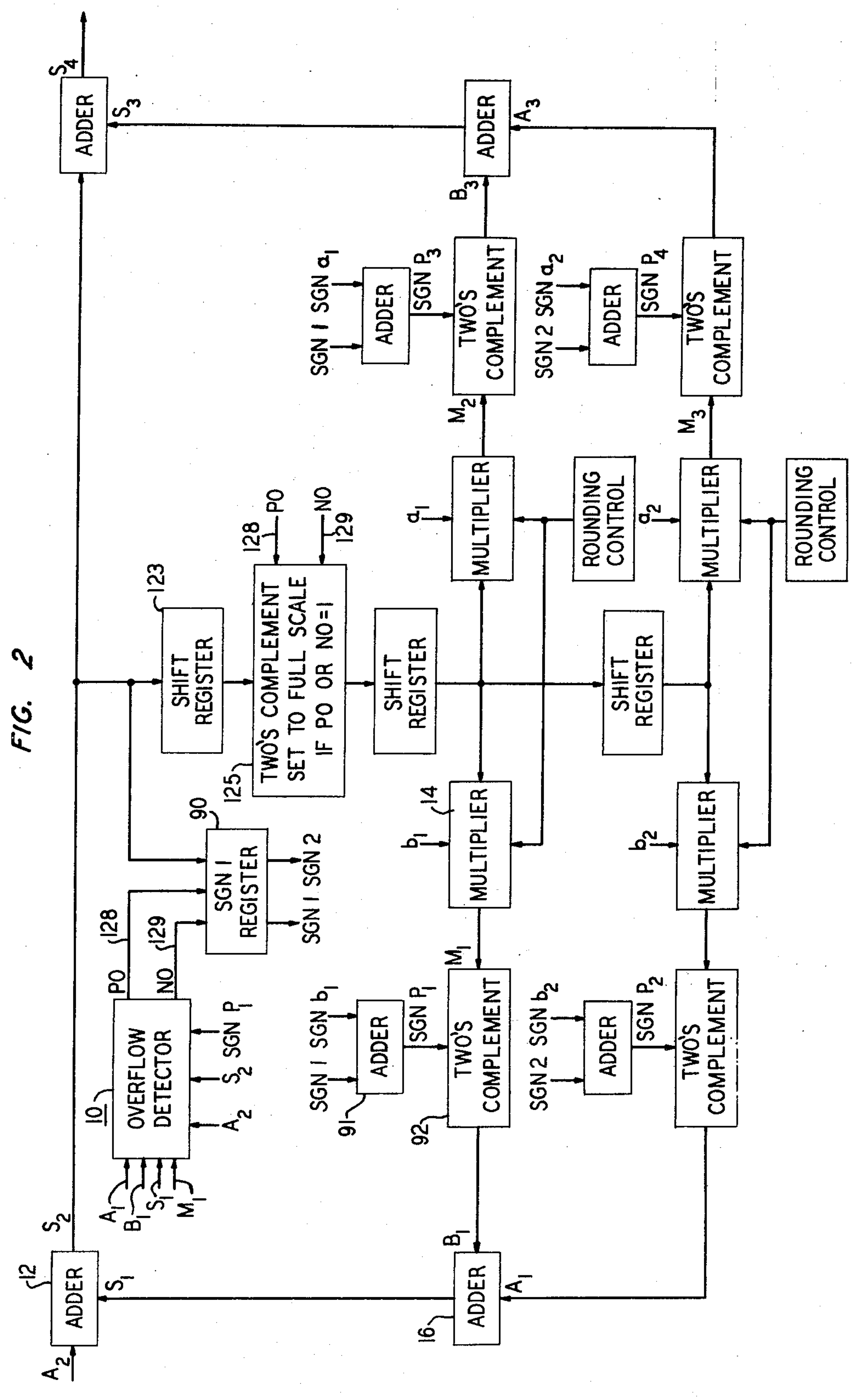
FIG. 2 is a block diagram of a digital filter including an overflow detector circuit.

FIG. 2 shows such an overflow detector circuit 10, interposed in a digital filter, for detecting all possible net overflows that occur in arithmetic operations performed by a first adder 12, a multiplier 14, and a second adder 16. The digital filter shown in FIG. 2 is disclosed and described in detail in the copending application of J. D. Heightley, Ser. No. 120,829, filed on Mar. 4, 1971.

Figure 3:
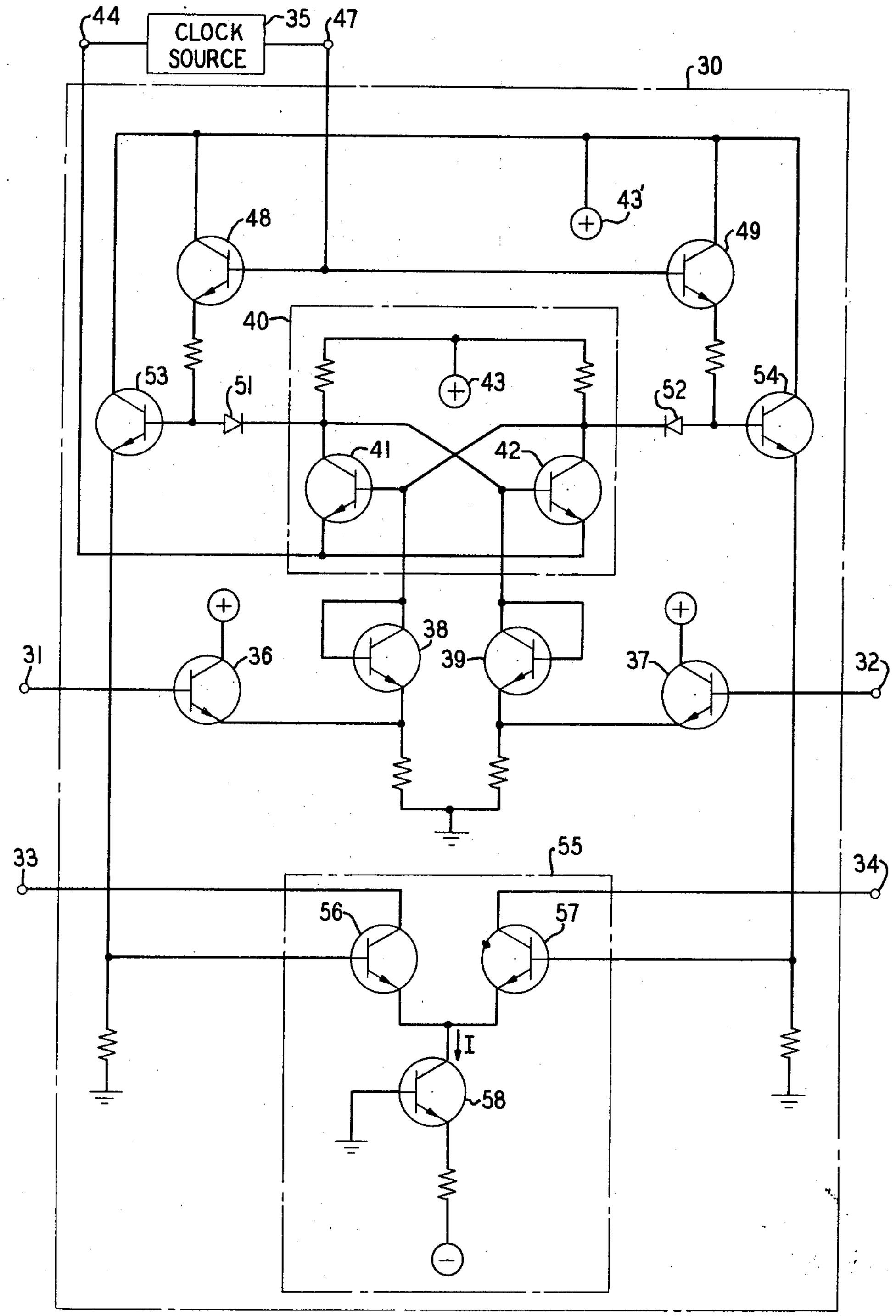
FIG. 3 is a schematic diagram of a storage-processor element used in the overflow detector circuit.

Referring now to FIG. 3, there is shown a schematic diagram of a storage-processor element 30 that is a building block for the overflow detector circuit of FIG. 1. The element 30 is a circuit that receives double-rail input data by way of terminals 31 and 32. While data is stored within the element 30, a unit of output current representative of the stored data is steered to one or the other of a pair of output terminals 33 and 34.

In FIG. 3 the input terminals 31 and 32 are coupled through a pair of emitter-follower connected transistors 36 and 37 and a pair of diode-connected transistors 38 and 39 to the input of a flip-flop circuit 40. This flip-flop circuit 40 includes a pair of transistors 41 and 42 cross-coupled conventionally so that the transistors 41 and 42 conduct alternatively.

A source 43, represented by a symbolic circle enclosing a plus sign, supplies operating bias to the flip-flop circuit 40. The symbol is used in several places in FIG. 3 to represent connections between the circuit of FIG. 3 and the positive terminal of a constant potential supply which has its negative terminal grounded.

A clock source 35 couples bias to the storage-processor element 30 by way of a terminal 44. This bias is a periodic control signal 45, shown in FIG. 4, and is used for controlling the operation of the flip-flop 40 of FIG. 3.

The flip-flop operates in a standby condition while the signal 45 of FIG. 4 is at the low positive potential shown from time $t_1$ through time $t_2$ in a first cycle time T1.

Recalling that double-rail input data signals are applied to the storage-processor element 30, it is noted that during standby operation the input signals are more positive than the potential of the signal 45 between times $t_1$ and $t_2$. The input signals are coupled through the emitter-followers 36 and 37 to the emitters of the transistors 38 and 39 which are only slightly forward-biased and therefore present a high impedance. While thus presenting a high impedance, the transistors 38 and 39 prevent input signals from affecting the operation of the flip-flop 40.

During standby operation, there is a second control signal 46, also shown in FIG. 4, applied by the clock source 35 of FIG. 3 through a terminal 47 to the base electrodes of transistors 48 and 49. The potential level of the control signal 46 for standby operation is a positive potential near the supply potential V. The transistors 48 and 49 and diodes 51 and 52 conduct current from supply terminal 43' to collector electrodes of the transistors 41 and 42.

Because they conduct, the diodes 51 and 52 couple different potential levels from the collector electrodes of the transistors 41 and 42 respectively to the base electrodes of transistors 53 and 54, which are connected as emitter-followers.

Parasitic capacitances at the base electrodes of the transistors 53 and 54 store quantities of charge representative of the potential levels from the collector electrodes of the transistors 41 and 42.

The emitter-follower transistors 53 and 54 transfer their base electrode potentials to their emitter electrodes and to a current steering circuit 55.

In the current steering circuit 55, the potentials of the emitters of the transistors 53 and 54, respectively, are applied directly to the base electrodes of transistors 56 and 57. An emitter circuit transistor 58 regulates the emitter current available to the transistors 56 and 57 to a predetermined magnitude that is referred to hereinafter as a unit of current I. This unit of current supplied through transistor 58 is steered substantially entirely through one or the other of the transistors 56 and 57. The one of the transistors 56 and 57 having a higher positive potential applied to its base electrode conducts the unit of current I from transistor 58 as the output signal of the storage-processor element 30.

To change information stored in the element 30, the bias control signals 45 and 46 applied to the terminals 44 and 47 are interchanged so that a potential near the supply potential V is applied to terminal 44 and a low positive potential is applied to the terminal 47. These new potential levels are shown in FIG. 4 between the times $t_2$ and $t_3$. The high positive potential on the terminal 44 is sufficient to cut off the transistors 41 and 42. As a result, the diode-connected transistors 38 and 39 are biased into conduction between the supply 43 and ground. The potential on the terminal 44 permits the bases of the transistors 41 and 42 to rise until they are clamped through the transistors 38 and 39 at potentials corresponding with the double-rail input signals then being applied to the terminals 31 and 32.

The two different potentials on the bases of the transistors 41 and 42 will set the flip-flop 40 in one or the other of its two stable states when the bias control signals 45 and 46 change again at the time $t_3$, as shown in FIG. 4.

Because the low potential is applied to terminal 47 between the times $t_2$ and $t_3$, the transistors 48 and 49 are cut off and the diodes 51 and 52 decouple the collector electrodes of the transistors 41 and 42 from the base electrodes of the transistors 53 and 54. Only the charge stored on the parasitic capacitances at the bases of transistors 53 and 54 temporarily hold those transistors in their states of conduction from the time $t_2$ until the time $t_3$. Thus, the output of the element 30 remains constant between the times $t_2$ and $t_3$ while new information is being stored in the flip-flop 40.

Referring now to FIG. 5, there is shown a symbolic block 60 representing the storage-processor element 30 of FIG. 3. This symbolic block 60 is used in the block diagram of the overflow detector circuit shown in FIG. 1.

Although the bias control signal input terminals 44 and 47, shown in FIG. 3, are omitted from the symbol of FIG. 5, it is to be understood that bias control signals, similar to those of FIG. 4, are applied to the block 60 as they are applied to the element 30 of FIG. 3. Thus, any circuit using the storage-processor element 60 has a source for applying bias control signals to the element 60.

Other input and output terminals are shown on block 60 of FIG. 5. Thus the double-rail input terminals 31 and 32 are shown at the bottom of the block 60, and the double-rail output terminals 33 and 34 are shown at the top of the block 60. Note that the outputs 33 and 34 are transposed from their positions shown in FIG. 3 so that a "1" input will produce a "1" output on the same end of the block 60. Such a transposition helps establish a more readily understandable convention for interconnecting several storage-processor elements, as shown in the circuit of FIG. 1. For convenience, the left-hand input 31 and output 34, as shown in FIG. 5, are considered to be "1" terminals.

In this convention, a "1" is considered to be stored in the element 60 when the potential applied to the terminal 31 is higher than the potential applied to the terminal 32 at time $t_3$ of cycle T1 in FIG. 4. After time $t_3$, a unit of current is pulled into the terminal 34 while a "1" is stored in element 60.

The overflow detector shown in the block diagram of FIG. 1 is divided into five major parts. Each of these major parts performs some logical functions to determine whether a net positive overflow (PO) or a net negative overflow (NO) has occurred in a code word as a result of arithmetic operations performed in the digital filter of FIG. 2.

The arithmetic operations performed in the upper left-hand loop of the digital filter of FIG. 2 are the relevant operations which are monitored by the overflow detector of FIG. 1. Operation of the remaining three loops of the digital filter does not affect the overflow detector described herein.

The logical functions performed by the five major parts of FIG. 1 occur in response to a pair of bias control signals from the clock source 35 included in a clock control circuit 61. The clock control circuit 61 includes a conventional counter and gate control circuit 62 for directing individual cycles of the clock control signals to separate pairs of output leads T1, T2, T3, T4, T5, T6, T7, T8, and T9 only during the clock cycles of FIG. 4, identically designated on the pairs of leads. During all clock cycles other than the clock cycle designated on each pair of leads of the control circuit 61, that pair of leads carries storage bias signals.

A first major part of FIG. 1 is an adder overflow detector 65 for the adder 12 of FIG. 2. As shown in FIGS. 1 and 2, the overflow detector 10 receives signals $A_2$, $S_1$, and $S_2$. The signals $A_2$ and $S_1$ also are the addend and augend inputs to the adder 12, and the signal $S_2$ is the output sum produced by the adder 12. Overflow detector 65 in FIG. 1 includes three storage-processor elements 70, 71, and 72 that receive and store respectively the sign bits of the inputs $A_2$, $S_1$, and $S_2$ when those sign bits are available during the cycles T5 and T7. The sign bits are available at different clock cycles because of delay imposed by the adder 12 of FIG. 2. A detailed description of the adder 12 is presented in a copending application of J. D. Heightley, Ser. No. 120,834, filed on Mar. 4, 1971.

Elements 70, 71, and 72, as well as other storage-processor elements (SPE) in the overflow detector, each includes a timing designator T5, or T7, etc., which is coordinated with the designator on one pair of output leads from the clock control circuit 61. Each of these elements 70, 71, and 72 stores a new sign bit during either the clock cycle T5, or the clock cycle T7 and retains such new sign bit for several clock cycles until another sign bit is available at the end of a word processing cycle of the adder 12 of FIG. 2.

In two's-complement arithmetic, it is known that an overflow of an adder occurs only when an addend and augend having the same sign are added together. The signs may be both positive or both negative. If an overflow occurs, the resulting sum has a sign of opposite polarity from the like signs of the addend and augend.

The adder overflow detector 65 of FIG. 1 includes two threshold logic circuits that are synthesized from double-rail outputs of the storage-processor elements 70, 71, and 72. Output current is conducted through one of the out-puts of each of those elements when information is stored therein.

In one of the threshold circuits, the "1" outputs of the elements 70 and 71 and the "0" output of the element 72 are coupled by way of a bus 74 to the "1" input of a storage-processor element 76 and to a combination of a resistor 75 and a fixed supply potential. A first reference potential $V_{R1}$ is applied to the "0" input of the element 76 to establish a threshold potential for the logic circuit.

In the other threshold circuit, the "0" outputs of the elements 70 and 71 and the "1" output of the element 72 are coupled by way of a bus 77 to the "1" input of a storage-processor element 78 and to a combination of a resistor 79 and the fixed supply potential. The first reference potential $V_{R1}$ is applied to the "0" input of the element 78 also for establishing a logic threshold.

Potentials on the busses 74 and 77 vary with variations of the number of units of current conducted therethrough because the voltage drop across the resistor 75 and the voltage drop across the resistor 79 change with the current.

The reference potential $V_{R1}$ is selected so that each of the storage-processor elements 76 and 78 is set to "1" at the time $t_3$ of cycle T8 only when no unit of current is conducted from the supply through the associated resistor 75 or 79 and bus 74 or 77, in response to information stored in the elements 70, 71, and 72. Thus the storage-processor element 76 is set to a "1" only when a "0" is stored in the elements 70 and 71 and a "1" concurrently is stored in the element 72 at the time $t_3$ of cycle T8 in FIG. 4. In addition, the storage-processor element 78 is set to a "1" only when a "1" is stored in the elements 70 and 71 and a "0" concurrently is stored in the element 72 at the time $t_3$ of cycle T8.

All other combinations of information stored in the elements 70, 71, and 72 at time $t_3$ of cycle T8 reset the elements 76 and 78 to their "0" states. Thus at time $t_3$ of cycle T8, no unit of current from any of the circuits 70, 71, and 72 can be conducted through the bus 74 if the element 76 is to be set to its "1" state or through the bus 77 if the element 78 is to be set to its "1" state.

As a result of an overflow occurring in the adder 12 of FIG. 2, a "1" is set into either the adder partial positive overflow (APPO) storage-processor element 76 or the adder partial negative overflow (APNO) storage-processor element 78 depending upon the polarity of the overflow.

A second major part of FIG. 1 is another adder overflow detector 80 which is similar to the overflow detector 65 except that the detector 80 checks for overflows from the adder 16 of FIG. 2. Thus the input signals for the detector 80 are the sign bits from the addend and augend $A_1$ and $B_1$ and the sum $S_1$ associated with the adder 16 of FIG. 2. These sign bits are received and stored in storage-processor elements 81, 82, and 83 when the bits are available during the clock cycles T3 and T5, as shown in the blocks 81, 82, and 83. The delay is imposed by the adder 16 of FIG. 2, which is similar to adder 12. The detector 80 determines whether the adder 16 has overflowed or not. If an overflow is detected, a signal representing such an overflow is stored during the clock cycle T8 in storage-processor element 84 or 85 depending upon whether the overflow is a partial positive overflow (APPO) or a partial negative overflow (APNO).

A third major part of FIG. 1 is an overflow detector 88 for the multiplier 14 of FIG. 2. The multiplier 14 multiplies the bits of a sample word with a group of bits representing a coefficient $b_1$ which may have a magnitude greater than one. Since the magnitude of coefficient $b_1$ is greater than one, there is a possibility of overflows occurring. If the magnitude of the coefficient were less than one, there would be no possibility of overflows occurring in the multiplier.

Operation of the multiplier 14 is described herein only to the extent necessary for an understanding of the operation of the overflow detector 88. A more detailed description of the multiplier 14 is disclosed in a copending patent application of J. D. Heightley, Ser. No. 120,829, filed on Mar. 4, 1971.

As previously mentioned, the multiplication operation is performed on sample words coded in the sign-magnitude representation. However, the multiplication is actually accomplished by separating the sign component from the magnitude component and processing the two components separately.

The sign bit of each sample word therefore is diverted in FIG. 2 into a SGN 1 register 90 for storage therein until the magnitude component of the sample word is processed by the multiplier 14.

In the multiplier, the sample word is a group of bits representing the magnitude and a sign bit equal to "0." This latter sign bit is always "0" when applied to the multiplier because only the magnitude of the sign-magnitude representation is processed by the multiplier circuit 14.

As a result of the multiplication process, the magnitude of the product may overflow so that a "1" appears as the last bit $M_1$ of the sample word. This "1," replacing the "0" in the sign bit position, indicates that a magnitude overflow has occurred in the multiplier. Whether an overflow occurs or not, the stored sign bit SGN 1 is added modulo 2 to a coefficient sign bit SGN $b_1$ in an adder 91 to determine a product sign bit SGN $P_1$.

The overflow detector 88 of FIG. 1 includes two storage-processor elements 96 and 97 which receive and store the last bit $M_1$ of each magnitude code word from the multiplier 14 of FIG. 2. At the time $t_3$ of clock cycle T1 in FIG. 4, the elements 96 and 97 are both set to "1" by the bit $M_1$ if an overflow occurred in the multiplier circuit 14 during the last pervious clock cycle. Otherwise they are reset to "0" during clock cycle T1.

In addition the detector 88 includes a storage-processor element 98 which receives and stores, at time $t_3$ of clock cycle T1, the product sign bit SGN $P_1$ from the adder 91 of FIG. 2. In effect, the bit SGN $P_1$ indicates the polarity of any magnitude overflows that occur in the multiplier 14.

Two threshold logic circuits, responsive to output currents caused by the sign bits $M_1$ and SGN $P_1$ stored in the elements 96, 97, and 98, are arranged to determine not only the fact that an overflow occurred in the multiplier 14 but also the polarity of such overflow. During the clock cycle T8, the result is stored in storage-processor elements 101 and 102.

A second reference potential $V_{R2}$ is applied to the "0" inputs of the elements 101 and 102 for the purpose of establishing similar threshold levels for the two logic circuits.

The "1" input of the multiplier partial positive overflow (MPPO) element 101 is connected to a bus 103 which also is connected to the "0" output of the element 96 and to the "1" output of the element 98. Potential on the bus 103 changes as the number of units of current conducted therethrough because voltage drop varies across resistor 104 as the current varies in that resistor. The threshold established by the potential $V_{R2}$ assures that the element 101 is set to a "1" at time $t_3$ of clock cycle T8 only after an overflow has occurred while the product sign bit SGN $P_1$ is a "0." Thus the potential $V_{R2}$ is greater than the potential of the bus 103 except when no unit of current is conducted through the bus 103.

The "1" input of the multiplier partial negative overflow (MPNO) element 102 is connected to a bus 105 which also is connected to the "0" outputs of the elements 97 and 98. Potential on bus 105 changes as the number of units of current conducted therethrough because voltage drop varies across resistor 106 as the current varies in that resistor. The threshold established by the potential $V_{R2}$ assures that the element 102 is set to a "1" at the time $t_3$ of clock cycle T8 only after an overflow has occurred while the sign bit SGN $P_1$ is a "1". Thus the potential $V_{R2}$ is greater than the potential of the bus 105 except when no unit of current is conducted through the bus 105.

Since the output elements 76, 78, 84, 85, 101, and 102 all store new information during the clock cycle T8, those elements all conduct output current representing the new information during the clock cycle T9. Such new information, represented by the output currents, is related to overflows incurred by the same sample code word in the digital filter of FIG. 1.

A net positive overflow gate and a net negative overflow gate are arranged to operate in response to the combinations of currents from the elements 76, 78, 84, 85, 101, and 102. Each of the net overflow gates includes a pair of threshold logic busses, a steering circuit, and a storage-processor element wherein indications of net overflows are stored.

Both of the net overflow gates are similar in configuration and operation. Therefore, only the net positive overflow gate will be described in detail hereinafter.

The net positive overflow gate is a threshold logic gate which includes busses 110 and 111, steering circuit 112, and a positive overflow (PO) storage-processor element 114. This net positive overflow gate is arranged to store in element 114 a net positive overflow at time $t_3$ of clock cycle T9 only when fewer than three (3) units of current are conducted by the bus 111.

Units of current are steered selectably to the bus 111 by the partial positive overflow circuits 76, 84, and 101, and by the steering circuit 112. Each one of the circuits 76, 84, and 101 steers one unit of current to the bus 111 when that particular circuit is storing a "0" indicating that no positive overflow just occurred in the associated multiplier 14 or adders 12 and 16. For example, the circuit 101 steers a unit of current to the bus 111 whenever the circuit 101 stores a "0" during clock cycle T9. This indicates that the multiplier did not produce a positive overflow during the relevant previous multiplication operation. Conversely, when a positive overflow is stored in any one of the circuits 76, 84, and 101, no unit of current is steered by that circuit to the bus 111.

The steering circuit 112 steers a unit of current to the bus 111 when one or more of the partial negative overflow circuits 78, 85, and 102 stores an indication that a negative overflow occurred in the associated multiplier 14 or adders 12 and 16.

For instance, the multiplier partial negative overflow circuit 102 steers one unit of current to the bus 110 during the clock cycle T9 if the circuit 102 is storing a "1" indicating that the multiplier 14 produced a negative overflow during the last previous multiplication operation. Because of voltage drop across a resistor 120, this unit of current in the bus 110 reduces the potential of the bus below a third reference potential $V_{R3}$. Since the bus 110 and the reference potential $V_{R3}$ are applied to opposite inputs of the steering circuit 112, that circuit steers a unit of current through a transistor 115 to the bus 111.

The circuit 101 simultaneously steers a unit of current to the bus 111 because the multiplier cannot overflow positively and negatively at the same time and we have assumed that a negative overflow has occurred.

A fourth reference potential $V_{R4}$ is applied to the "0" input of the element 114, and the potential of the bus 111 is applied to the "1" input of the same element. The potential on the bus 111 changes with the number of units of current conducted therethrough because voltage drop across resistor 121 varies with the current. Potential $V_{R4}$ is selected so that the element 114 stores a "0" at time $t_3$ of clock cycle T9 when three or more units of current are conducted through the bus 111. A "1" is stored in element 114 at time $t_3$ of clock cycle T9 only if fewer than three units of current are conducted through the bus 111.

Thus if the multiplier 14 of FIG. 2 has produced a negative overflow as previously mentioned, then a "1" can be set into the storage-processor element 114 only if the elements 76 and 84 both store "1s" indicating that their associated adders 12 and 16 produced positive overflows while processing the same sample code word which produced the negative overflow in the multiplier 14.

Other combinations of positive overflows from the multiplier and the adders also indicate a net positive overflow. For instance, when the multiplier and both adders overflow positively while processing the same sample word, then the positive element 114 will store a positive overflow. Also, when one or two of the adders and the multiplier overflow positively while there are no negative overflows resulting from processing the same sample word, a net positive overflow is stored in element 114.

The net negative overflow gate is another threshold logic gate. It includes busses 116 and 117, steering circuit 118, and a net negative overflow (NO) storage-processor element 119. This circuit is arranged and operated analogous to the net positive overflow circuit previously described except that polarities must be adjusted.

Thus, the net negative overflow gate stores a "0" in the element 119 at all times except when a net negative overflow has occurred. The reference potential $V_{R4}$ is applied to the "0" input of the element 119 so that the element 119 is set to "1" only when fewer than three units of current are conducted by the bus 117 and is reset to "0" whenever three or more units of current are conducted by the bus 117.

Operation of the net positive overflow gate and the net negative overflow gate may be better understood by reference to FIG. 6 which shows how those gates respond to all different combinations of positive and negative overflows from the multiplier 14 and the adders 12 and 16.

Referring now to FIG. 6, there is shown a threshold logic table for the block diagram of FIG. 1. The table basically is a table of combinations of current units which store information in the storage-processor elements. Combinations of input conditions are shown in the rows of the table.

For instance, different combinations of partial positive overflows and partial negative overflows are shown in columns 1 and 2 where numbers under the headings represent the number of partial overflows occurring as a result of processing the same sample word regardless of whether the overflows are produced by the multiplier or by one or the other of the adders of FIG. 2.

Net positive and negative overflows are shown, respectively, in columns 6 and 10. A comparison of columns 1 and 2 with column 6 shows that net positive overflows only occur when there are more partial positive overflows indicated in column 1 than partial negative overflows in column 2. Conversely, the net negative overflows of column 10 occur only when there are more partial negative overflows than partial positive overflows.

Columns 5 and 9 show units of current that are conducted by the busses 111 and 117. More particularly in column 5, units of current are steered to the bus 111 from a combination of the circuits 76, 84, 101, and 112, as indicated by the total of the units of current shown in columns 3 and 4. Likewise, units of current are steered to the bus 117 as shown by the units of current listed in columns 7 and 8.

Briefly, two different rows of FIG. 6 describe the following operation of the circuit of FIG. 1:

First of all the second row from the top of FIG. 6 shows the effects of one partial positive overflow and no partial negative overflows. The partial positive overflow can occur in either the multiplier or in one of the adders. Although a unit of current normally is steered through the bus 111 by each of the circuits 76, 84, and 101, the overflow causes the associated circuit to divert one of the three units away from the bus 111. As shown in column 3, only two units of current are then conducted by the three circuits 76, 84, and 101. Since there are no negative overflows shown in column 2, no units of current are steered by the circuit 112 into the bus 111, as shown in column 4. In total, the bus 111 conducts only two units of current, shown in column 5, and steered to the bus 111 by the combination of circuits 76, 84, and 101.

Column 6 shows that a net positive overflow indication, i.e., a "1," is to be stored in the net positive overflow element 114 of FIG. 1 because only two units of current are conducted through the bus 111.

Column 7 shows that the normal three units of current are conducted by the circuits 78, 85, and 102. Column 8 shows that the circuit 118 steers a unit of current through bus 117 in response to the positive overflow. The units of current conducted by the bus 117 equal the four shown in column 9 and derived from the three units of current shown in column 7 and the one unit of current shown in column 8.

Column 10 indicates that the net negative overflow element 119 stores no net negative overflow, i.e., the element 119 stores a "0," because three or more units of current are conducted through the bus 117.

Thus, the second row of FIG. 6 shows that the combination of one positive overflow and no negative overflows results in an indication of a net positive overflow being stored in the net positive overflow element 114 and no net negative overflow being stored in the element 119.

Secondly, refer to the second row from the bottom of FIG. 6 where there is shown the results of one partial positive overflow and two partial negative overflows. The one partial positive overflow reduces the normal three units of current conducted by the circuits 76, 84, and 101 to two units of current, as shown in column 3. This means that one of the three circuits 76, 84, and 101 diverts its unit of current away from the bus 111.

Column 4 indicates that the circuit 112 steers a unit of current to the bus 111 in response to the two negative overflows because the circuit 112 is arranged to steer a unit of current to the bus 111 if there are one or more partial negative overflows.

The two units of current from two of the three circuits 76, 84, and 101 plus the single unit of current from the circuit 112 result in three units of current being conducted by the bus 111, as shown in column 5.

Column 6 indicates that the net positive overflow element 114 stores no net positive overflow, i.e., a "0," because three units of current are being conducted through the bus 111.

Continuing along the second from the bottom row of FIG. 6, there is but one unit of current steered by the combination of three circuits 78, 85, and 102 to the bus 117, as shown in column 7. Thus two of the three circuits 78, 85, and 102 do not steer units of current to the bus 117 because there are two negative overflows, as indicated in column 2.

Column 8 indicates that an additional unit of current is steered to the bus 117 by the steering circuit 118 in response to the single positive overflow shown in column 1.

In total the bus 117 conducts two units of current, as indicated in column 9. These two units originate respectively from the steering circuit 118 and from one of the three circuits 78, 85, and 102.

Column 10 shows that a "1" is stored in the net negative overflow element 119 to indicate that a net negative overflow has occurred because fewer than three units of current are conducted through the bus 117.

Thus the second from the bottom row of FIG. 6 indicates that the combination of one positive overflow and two negative overflows results in the storage of no net positive overflow in the element 111 and the storage of a net negative overflow in the element 119, as expected.

As previously mentioned, each row of the table of FIG. 6 represents a different combination of input overflows from the multiplier and adders. If the reader analyzes the remaining rows of FIG. 6, he should understand the entire operation of net overflow detection. It is noted once again that each positive and each negative overflow shown in columns 1 and 2 may occur in response to an overflow stored in any one of the partial overflow circuits 76, 78, 84, 85, 101, and 102, shown in FIG. 1. A partial positive overflow and a partial negative overflow occurring concurrently as in the bottom row merely cancel one another leaving neither a net positive nor a net negative overflow.

Referring once again to FIG. 2, output leads 128 and 129 from the overflow detector 10 apply to the SGN 1 register 90 signals PO and NO representing the results of the overflow detection operation. In the SGN 1 register 90, the net overflow signals set or reset the contents of that register to agree with the polarity of any detected net overflow. The bit thus set into register 90 is the sign bit of the sample then in shift register 123.

Additionally, in FIG. 2 the leads 128 and 129 apply signals PO and NO to the output element of a two's-complement circuit 125. This two's-complement circuit 125 converts the sample word, represented in two's-complement form and just checked for net overflow, into a magnitude form so that the sign can be stored in the SGN 1 register 90 and the magnitude can be forwarded to the multiplier 14. If either the net positive or the net negative overflow circuits 114 and 119 of FIG. 1 store a "1" indicating a net overflow, then the signal PO or NO representing that overflow is applied to the output element of the two's-complement circuit 125 during the two's-complement operation on the sample word to convert the entire word to full scale, i.e., all 1's except for the sign bit which is a "0." By thus converting the entire word to full scale and by adjusting the bit stored in the SGN 1 register 90, as previously mentioned, the net overflow is canceled and replaced by a sample code word that is sufficiently accurate for further processing.

Figure 7:
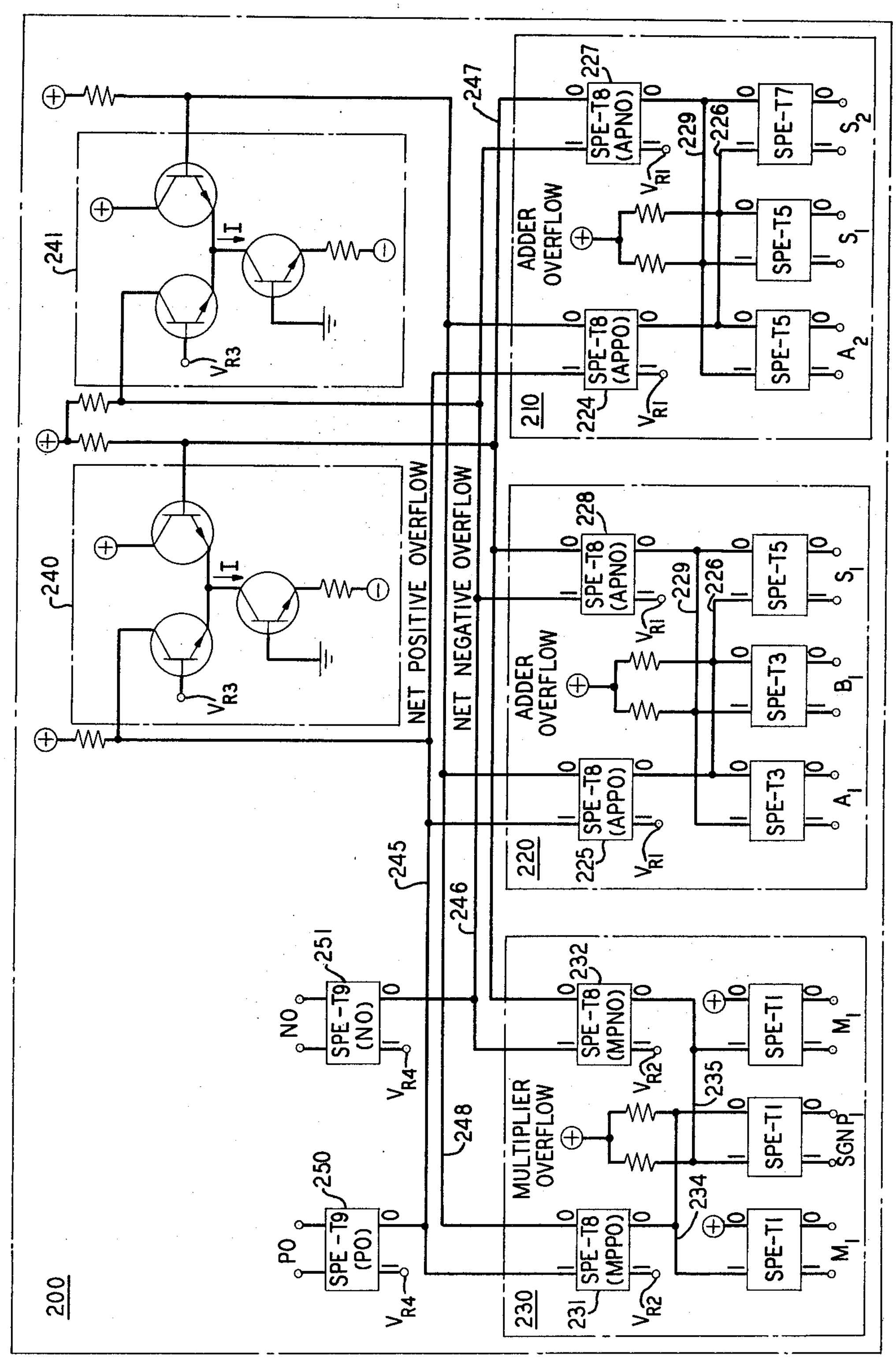
FIG. 7 is a block diagram of an alternative embodiment of the net overflow detector.

Referring now to FIG. 7, there is shown an alternative overflow detector circuit 200. The threshold logic circuits of the adder and multiplier overflow detector circuits and of the net positive and net negative overflow circuits have been modified so that they function at different threshold potentials than the threshold potentials used in the circuits of FIG. 1. Additionally, the steering circuits respond to different threshold potentials than those used in the circuits of FIG. 1.

In the adder overflow circuits 210 and 220, the interconnections between elements are changed. As a result, the reference potential $V_{R1}$ is selected so that the elements 224 and 225 are set to "1" only when three units of current are conducted in the busses 226. Also, the elements 227 and 228 are set to "1" only when three units of current are conducted in the busses 229.

Likewise, in the multiplier overflow circuit 230, the interconnections between elements are modified. The reference potential $V_{R2}$ is selected so that the elements 231 and 232 are set to "1" only when two units of current are conducted in the busses 234 and 235 respectively.

The reference potential $V_{R3}$ is selected so that the steering circuits 240 and 241 steer a unit of current to the net positive and net negative overflow busses 245 and 246 only when at least three units of current are conducted respectively in the busses 247 and 248.

Net positive and net negative overflow elements 250 and 251 have their "0" inputs connected respectively to the busses 245 and 246. The reference potential $V_{R4}$, applied to the "1" inputs of the elements 250 and 251, is selected so that the elements 250 and 251 are set to "1" only when at least two units of current are conducted respectively in the busses 245 and 246.

The overflow detector of FIG. 7 produces the same output response to net positive and net negative overflows as produced by the circuit of FIG. 1.

There has been described a pair of overflow detector circuits that respond to the sign bits of a multiplier and two adders in a digital filter for producing an indication of net overflows and for adjusting the sign and magnitude bits of the sample code word whenever a net overflow of either polarity is detected.

The above-detailed description is illustrative of two embodiments of the invention, and it is to be understood that additional embodiments thereof will be obvious to those skilled in the art. The embodiments described herein together with those additional embodiments are considered to be within the scope of the invention.

What is claimed is:

1. A net overflow detector circuit for first and second adder circuits and a multiplier circuit, the detector circuit comprising
first means for detecting a partial overflow of either one of two polarities and produced by the first adder circuit,
second means for detecting a partial overflow of either one of two polarities and produced by the second adder circuit,
third means for detecting a partial overflow of either one of two polarities and produced by the multiplier circuit, and
means responsive to the first, second, and third detecting means for detecting all net overflow conditions resulting from all possible combinations of overflow from the first and second adder circuits and the multiplier circuit.

2. An overflow detector circuit in accordance with claim 1 further comprising
first, second, third, and fourth busses included within the net overflow detecting means,
means producing first and second clock signals,
said first, second, and third detecting means, each including
a first circuit responsive to the first clock signal for storing a positive overflow and for conducting a unit of current to one or the other of the first and second busses, and
a second circuit responsive to the first clock signal for storing a negative overflow and for conducting a unit of current to one or the other of the third and fourth busses,
means responsive to the units of current conducted through the first bus for producing a predetermined potential thereon,
means responsive to the units of current conducted through the second bus for producing a predetermined potential thereon,
means responsive to the units of current conducted through the third bus for producing a predetermined potential thereon, and
means responsive to the units of current conducted through the fourth bus for producing a predetermined potential thereon.

3. A net overflow detector circuit in accordance with claim 2 further comprising
a source of first reference potential,
the net overflow detecting means further comprising
means comparing the potential of the first bus with the first reference potential and steering a unit of current to the fourth bus when at least one unit of current is conducted through the first bus, and
means comparing the potential of the third bus with the first reference potential and steering a unit of current to the second bus when at least one unit of current is conducted through the third bus.

4. A net overflow detector circuit in accordance with claim 3 further comprising
a source of second reference potential,
the net overflow detecting means further comprising
means responsive to the second clock signal for comparing the potential of the second bus with the second reference potential and for storing a "0" except when less than three units of current are conducted through the second bus, and
means responsive to the second clock signal for comparing the potential of the fourth bus with the second reference potential and for storing a "0" except when less than three units of current are conducted through the fourth bus.

5. A net overflow detector circuit in accordance with claim 2 further comprising
a source of first reference potential,
the net overflow detecting means further comprising
means comparing the potential of the first bus with the first reference potential and steering a unit of current to the fourth bus when at least three units of current are conducted through the first bus, and
means comparing the potential of the third steering bus with the first reference potential and steering a unit of current to the second bus when at least three units of current are conducted through the third bus.

6. A net overflow detector circuit in accordance with claim 5 further comprising
a source of second reference potential,
the net overflow detecting means further comprising
first bistable means responsive to the potential of the second bus and the second reference potential for assuming a first stable state when less than two units of current are conducted through the second bus and for assuming a second table state when at least two units of current are conducted through the second bus, and
second bistable means responsive to the potential of the fourth bus and the second reference potential for assuming a first stable state when less than two units of current are conducted through the fourth bus and for assuming a second stable state when at least two units of current are conducted through the fourth bus.

7. An adder overflow detector comprising means producing first, second, and third clock signals, means responsive to the first clock signal for storing a sign bit of an addend code word, means responsive to the first clock signal for storing a sign bit of an augend code word, means responsive to the second clock signal for storing a sign bit of a sum code word produced by the adder in response to the addend and augend code words, first and second busses connected to the three storing means, the storing means each comprising bistable means for storing information, and steering means responsive to the clock signals and the state of the bistable means for steering a unit of current to one or the other of the busses, means responsive to the units of current conducted through the first bus for producing a predetermined potential thereon, means responsive to the units of current conducted through the second bus for producing a predetermined potential thereon, a source of reference potential, means responsive to the third clock signal for comparing the potential of the first bus with the reference potential and for storing a "1" only when three units of current are conducted through the first bus, and means responsive to the third clock signal for comparing the potential of the second bus with the reference potential and for storing a "1" only when the three units of current are conducted through the second bus.

8. An adder overflow detector comprising first and second busses, means for storing an addend sign bit and for steering a unit of current to one or the other of the first and second busses depending upon the polarity of the addend sign bit, means for storing an augend sign bit and for steering a unit of current to one or the other of the first and second busses depending upon the polarity of the augend sign bit, means for storing a sum sign bit and for steering a unit of current to one or the other of the first and second busses depending upon the polarity of the sum sign bit, means responsive to the units of current conducted through the first and second busses for producing predetermined potentials thereon, a reference potential, bistable means responsive to the reference potential and to the potential of the first bus for assuming a first stable state when no unit of current is conducted in the first bus and for assuming a second stable state when at least one unit of current is conducted in the first bus, and bistable means responsive to the reference potential and to the potential of the second bus for assuming a first stable state when no unit of current is conducted in the second bus and for assuming a second stable state when at least one unit of current is conducted in the second bus.

9. A multiplier overflow detector comprising means producing first and second clock signals, first and second means responsive to the first clock signal for storing a sign bit of a magnitude code word from the multiplier, third means responsive to the first clock signal for storing a product sign bit of the output code word, a first bus connected to the first and third storing means, a second bus connected to the second and third storing means, the storing means each comprising bistable means for storing information, and steering means responsive to the first clock signal and the state of the bistable means for selectively steering a unit of current to the connected bus, means responsive to the units of current conducted through the first bus for producing a predetermined potential thereon, means responsive to the units of current conducted through the second bus for producing a predetermined potential thereon, a source of reference potential, means responsive to the second clock signal for comparing the potential of the first bus with the reference potential and for storing a "1" only when two units of current are conducted through the first bus, and means responsive to the second clock signal for comparing the potential of the second bus with the reference potential and for storing "1" only when two units of current are conducted through the second bus.

10. A multiplier overflow detector comprising first and second busses, first and second means for storing a sign bit of a magnitude code word from the multiplier, the first means for selectively steering a unit of current to the first bus and the second means for selectively steering a unit of current to the second bus, both depending upon the polarity of the magnitude sign bit, means for storing a product sign bit of the output code word and for steering a unit of current to the first or second busses depending upon the polarity of the product sign bit, means responsive to the units of current conducted through the first and second busses for producing predetermined potentials thereon, a reference potential, bistable means responsive to the reference potential and to the potential on the first bus for assuming a first stable state when no unit of current is conducted through the first bus and for assuming a second stable state when at least one unit of current is conducted through the first bus, and bistable means responsive to the reference potential and to the potential on the second bus for assuming a first stable state when no unit of current is conducted through the second bus and for assuming a second stable state when at least one unit of current is conducted through the second bus.

11. A multiplier overflow detector comprising first and second busses, first and second means for storing a sign bit of a magnitude code word from the multiplier, the first means for selectively steering a unit of current to the first bus and the second means for selectively steering a unit of current to the second bus, both depending upon the polarity of the magnitude sign bit, means for storing a product sign bit of the output code word and for steering a unit of current alternatively to the first or second bus depending upon the polarity of the product sign bit, means responsive to the units of current conducted through the first and second busses for producing predetermined potentials thereon, a reference potential, bistable means responsive to the reference potential and to the potential on the first bus for assuming a first stable state when two units of current are conducted through the first bus and for assuming a second stable state when less than two units of current are conducted through the first bus, and bistable means responsive to the reference potential and to the potential on the second bus for assuming a first stable state when two units of current are conducted through the second bus and for assuming a second stable state when less than two units of current are conducted through the second bus.

12. An adder overflow detector comprising first and second busses, means for storing a first addend sign bit and for steering a unit of current to one or the other of the first and second busses depending upon the polarity of the first addend sign bit, means for storing a second addend sign bit and for steering a unit of current to one or the other of the first and second busses depending upon the polarity of the second addend sign bit, means for storing a sum sign bit and for steering a unit of current to one or the other of the first and second busses depending upon the polarity of the sum sign bit, means responsive to the units of current conducted through the first and second busses for producing predetermined potentials thereon, a reference potential, bistable means responsive to the reference potential and to the potential of the first bus for assuming a first stable state when three units of current are conducted in the first bus and for assuming a second stable state when less than three units of current are conducted in the first bus, and bistable means responsive to the reference potential and to the potential of the second bus for assuming a first stable state when three units of current are conducted in the second bus and for assuming a second stable state when less than three units of current are conducted in the second bus.

* * * * *